United States Patent
Al-Yami et al.

(10) Patent No.: US 10,640,694 B2
(45) Date of Patent: May 5, 2020

(54) COMPOSITIONS AND METHODS OF MAKING OF SHALE INHIBITION FLUIDS

(71) Applicant: Saudi Arabian Oil Company, Dhahran (SA)

(72) Inventors: Abdullah Al-Yami, Dhahran (SA); Vikrant Wagle, Abqaiq (SA); Hussain Al-Bahrani, Qatif (SA); Ali Al-Safran, Dhahran (SA); Nassar Al-Alhareth, Dhahran (SA)

(73) Assignee: SAUDI ARABIAN OIL COMPANY (SA)

(*) Notice: Subject to any disclaimer, the term of this patent is extended or adjusted under 35 U.S.C. 154(b) by 0 days.

(21) Appl. No.: 15/669,669

(22) Filed: Aug. 4, 2017

(65) Prior Publication Data

US 2018/0223163 A1    Aug. 9, 2018

Related U.S. Application Data

(60) Provisional application No. 62/454,531, filed on Feb. 3, 2017.

(51) Int. Cl.
| | |
|---|---|
| C09K 8/24 | (2006.01) |
| E21B 21/00 | (2006.01) |
| C08L 71/02 | (2006.01) |
| C09K 8/52 | (2006.01) |

(52) U.S. Cl.
CPC ............... *C09K 8/24* (2013.01); *C08L 71/02* (2013.01); *C09K 8/52* (2013.01); *E21B 21/00* (2013.01); *C09K 2208/12* (2013.01); *C09K 2208/32* (2013.01); *E21B 21/003* (2013.01)

(58) Field of Classification Search
None
See application file for complete search history.

(56) References Cited

U.S. PATENT DOCUMENTS

| | | | |
|---|---|---|---|
| 3,953,337 | A | 4/1976 | Walker |
| 4,172,800 | A | 10/1979 | Walker |
| 4,411,801 | A | 10/1983 | Pomerleau et al. |
| 4,561,985 | A | 12/1985 | Glass, Jr. |
| 4,614,235 | A | 9/1986 | Keener et al. |
| 4,719,021 | A | 1/1988 | Branch, III |
| 4,799,962 | A | 1/1989 | Ahmed |
| 5,362,312 | A | 11/1994 | Skaggs et al. |

(Continued)

FOREIGN PATENT DOCUMENTS

| | | |
|---|---|---|
| CA | 2058856 A1 | 7/1992 |
| EP | 0495579 B1 | 2/1996 |

(Continued)

OTHER PUBLICATIONS

Kaminski et al., "Clearly Cloudy—Finding a Clouding Glycol System for Formate Brines", 20th SPE Bergen One Day Seminar. SPE.(2013).

(Continued)

*Primary Examiner* — Jeffrey D Washville
(74) *Attorney, Agent, or Firm* — Bracewell LLP; Constance Gall Rhebergen

(57) ABSTRACT

Provided here are polyethylene glycol-based drilling fluid compositions and methods of making and using such compositions during drilling operations for recovery of hydrocarbons. Various other embodiments may be disclosed and claimed.

18 Claims, 2 Drawing Sheets

(56) References Cited

U.S. PATENT DOCUMENTS

| | | |
|---|---|---|
| 5,942,468 A | 8/1999 | Dobson, Jr. et al. |
| 6,103,671 A | 8/2000 | Dobson et al. |
| 6,544,933 B1 | 4/2003 | Reid et al. |
| 6,635,604 B1 | 10/2003 | Halliday et al. |
| 6,706,667 B1 | 3/2004 | Smith et al. |
| 6,818,597 B2 | 11/2004 | Harris |
| 7,343,986 B2 | 3/2008 | Dixon |
| 7,614,462 B2 | 11/2009 | Dixon |
| 8,242,059 B2 | 8/2012 | Sawdon |
| 8,450,386 B2 | 5/2013 | Melbouci |
| 2005/0256232 A1 | 11/2005 | Walsh et al. |
| 2006/0018968 A1 | 1/2006 | Melbouci |
| 2013/0165351 A1* | 6/2013 | Tej .................. C09K 8/06 507/139 |
| 2015/0152313 A1 | 6/2015 | Picco et al. |
| 2016/0289530 A1 | 10/2016 | Nelson |

FOREIGN PATENT DOCUMENTS

| | | |
|---|---|---|
| GB | 2000799 A | 1/1979 |
| JP | 2006181656 | 7/2006 |
| WO | 199624645 A1 | 8/1996 |
| WO | 2016168177 A1 | 10/2016 |

OTHER PUBLICATIONS

Mech, et al., Effect of molecular weight of polyethylene glycol(PEG), a hydrate inhibitive water-based drilling fluid additive, on the formation and dissociation kinetics of methane hydrate, Journal of Natural Gas Science and Engineering. vol. 35, Part B, Sep. 2016, pp. 1441-1452.

International Search Report and Written Opinion for International Application No. PCT/US2017/045487; report dated Nov. 20, 2017; 14 pages.

* cited by examiner

COMPOSITIONS AND METHODS OF MAKING OF SHALE INHIBITION FLUIDS

CROSS-REFERENCE TO RELATED APPLICATIONS

This application claims priority to and benefit of U.S. Provisional Patent Application No. 62/454,531 titled "Compositions And Methods of Making of Shale Inhibition Fluids" filed on Feb. 3, 2017, the entire contents of which is incorporated herein by reference.

TECHNICAL FIELD

The disclosure relates to drilling fluid compositions used in the treatment of hydrocarbon wells. More specifically, the fluid compositions described here inhibit the interaction between subterranean formations and drilling systems.

BACKGROUND

Interaction of the drilling fluid with shale is a major cause of wellbore instability. The clay minerals present in the shale, such as kaolinite, bentonite, smectite, and montrolite interact with the water present in the drilling fluids, and this interaction can cause wellbore instability. For example, the clay minerals swell when they interact with the water, then expand and slough off. This shale sloughing reduces efficiency of the drilling fluid to lift the drilled cuttings and decreases the structural integrity of the wellbore. In some instances, the shale can weaken, and eventually collapse into the wellbore. Shale inhibition fluids are utilized to minimize this interaction.

SUMMARY

Drilling fluids disclosed and described here inhibit the interaction between shale and water in the drilling fluids. They reduce the swelling of shale formations, thus allowing the maintenance of a high rate of penetration and good bore hole stability during hydrocarbon recovery operations. In an embodiment, the drilling fluid composition contains polyethylene glycol polymers of molecular weights in the range of 190 grams per mole to 630 grams per mole. The drilling fluid composition can further include one or more of a weighting agent, a fluid loss-control agent, a corrosion inhibitor, a rheology modifier, a defoamer, and derivatives thereof. The polyethylene glycol polymers present in the composition can have a weight average molecular weight of 200 grams per mole. In an embodiment, the polyethylene glycol polymers can be present at a concentration ranging from 5% to 80% by weight of a water-miscible drilling fluid composition.

Also disclosed are methods of preparing a drilling fluid composition. One such embodiment includes first mixing water and polyethylene glycol polymers of molecular weights in the range of 190 grams per mole to 630 grams per mole; and followed by the addition of bentonite to achieve a concentration of polyethylene glycol polymers of at least five percent by weight of the drilling fluid. In an embodiment, the polyethylene glycol polymers used in this method have a weight average molecular weight of 200 grams per mole. In an embodiment, the polyethylene glycol polymers used in the method can be present at a concentration ranging from 5% to 80% by weight of a water-miscible drilling fluid composition. The resulting drilling fluid can further include an additive being at least one member of the group consisting of a weighting agent, a fluid loss-control agent, a corrosion inhibitor, a rheology modifier, a defoamer, or their derivatives.

Also disclosed are methods of stabilizing shale in a subterranean formation. One such method includes the steps of introducing an aqueous drilling fluid through a wellbore, the aqueous drilling fluid containing polyethylene glycol polymers of molecular weights in the range of 190 grams per mole to 630 grams per mole; and circulating the aqueous drilling fluid through the wellbore during drilling. The polyethylene glycol polymers used in this method can have a weight average molecular weight of 200 grams per mole. In an embodiment, the polyethylene glycol polymers can be present at a concentration ranging from 5% to 80% by weight of a water-miscible drilling fluid composition.

BRIEF DESCRIPTION OF THE DRAWINGS

Embodiments will be readily understood by the following detailed description in conjunction with the accompanying drawings. Embodiments are illustrated by way of example and not by way of limitation in accompanying drawings.

DETAILED DESCRIPTION

Figure 1:
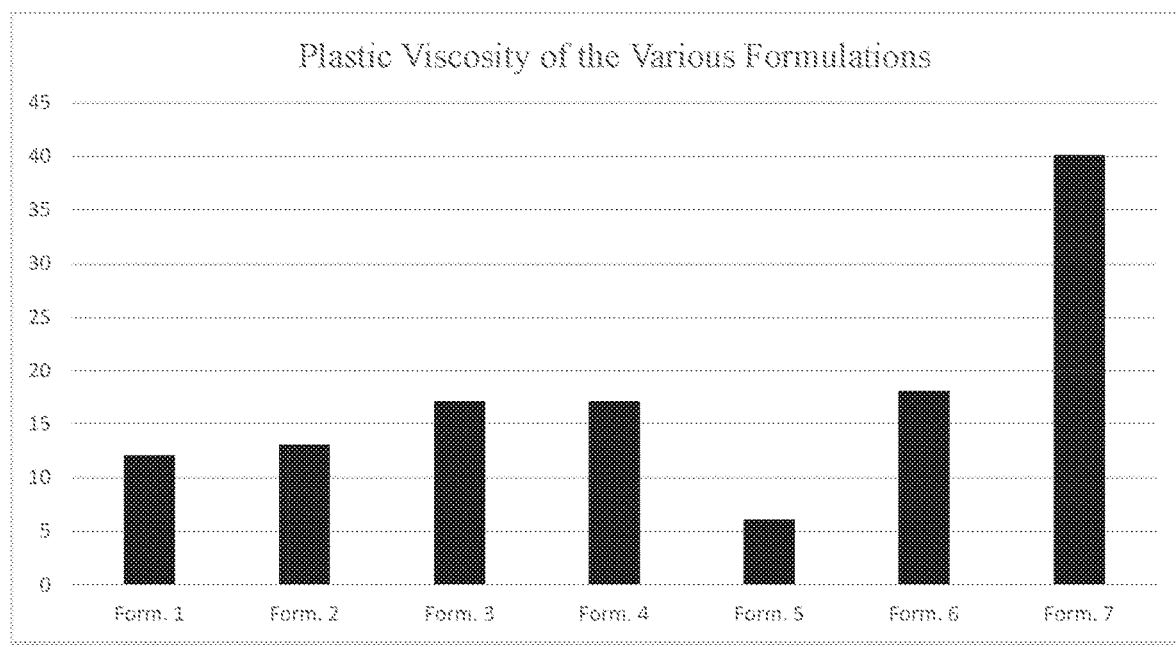
FIG. 1 is a graphical representation of the plastic viscosity (PV) of the drilling fluid formulations described in Example 1, in accordance with various embodiments.

The present disclosure describes various embodiments related to compositions and methods of making and using shale inhibition fluids. These drilling muds have improve rheological properties and shale inhibition capabilities. Embodiments include a water-miscible glycol-based drilling fluid and its use in drilling highly active shale formations. Embodiments include water-miscible glycol polymers of polyethylene glycol, propylene glycol, butylene glycol, or combinations thereof. Embodiments include formulations containing certain polyethylene glycol polymers, which are highly effective as inhibitors of interactions with the shale due to their solubility in water. These high performance drilling fluids provide stabilization of the shale and inhibition of formation of the active and swellable shale. Embodiments include shale inhibition fluids containing polyethylene glycol of different molecular weights, ranging from 190 grams per mole (g/mol) to 630 g/mol. Embodiments include inhibition fluids containing polyethylene glycol polymers of different molecular weights at various concentrations. Polyethylene glycol can be present in certain embodiments at a concentration of less than about eighty weight percent (80 wt %) of the drilling fluid. Certain embodiments include methods of addition of polyethylene glycol prior to the addition of water in the making of drilling fluids to provide more shale inhibition.

In the following description, numerous details are set forth in order to provide a thorough understanding of the various embodiments. In other instances, well-known processes, devices, and systems may not been described in particular detail in order not to unnecessarily obscure the various embodiments. In the following detailed description, reference is made to the accompanying drawings that form a part of this disclosure. Other embodiments may be utilized, and logical changes may be made without departing from the scope of this disclosure.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous. The term "approximately" as used here means within an acceptable error range for the particular value as determined by one of ordinary skill in the art, which will depend in part on how the value is measured or determined, that is, the limitations of the measurement system.

The term "subterranean formation" includes both a rock containing hydrocarbons, in particular oil, and the various rock layers traversed in order to access this oil-bearing rock and to ensure the extraction of the hydrocarbons. The term "rock" is used to denote any type of material of a solid subterranean formation, whether or not the material constituting it is strictly speaking a rock.

Embodiments of the polyethylene glycol-based shale inhibition fluid compositions include water-miscible glycol-based drilling fluids containing polyethylene glycol of different molecular weights. In various embodiments, the weight average molecular weight of polyethylene glycol can be approximately 190 g/mol to 630 g/mol. In other embodiments, the weight average molecular weight of polyethylene glycol can be approximately 190 g/mol to 210 g/mol. In other embodiments, the weight average molecular weight of polyethylene glycol can be approximately 190 g/mol to 315 g/mol. In other embodiments, the weight average molecular weight of polyethylene glycol can be approximately 190 g/mol to 420 g/mol. In other embodiments, the weight average molecular weight of polyethylene glycol can be approximately 190 g/mol to 570 g/mol. In other embodiments, the weight average molecular weight of polyethylene glycol can be approximately 190 g/mol to 630 g/mol. In other embodiments, the weight average molecular weight of polyethylene glycol can be approximately 190 g/mol to 1050 g/mol. For example, the drilling fluid can contain one or more of the various types of polyethylene glycol, such as polyethylene glycol 200 (PEG 200), polyethylene glycol 300 (PEG 300), polyethylene glycol 400 (PEG 400), polyethylene glycol 600 (PEG 600), polyethylene glycol 1200 (PEG 1200), and polyethylene glycol 1500 (PEG 1500). PEG 200, PEG 300, PEG 400, or PEG 600 have substantially complete solubility in water and hence impart good shale inhibition. Polyethylene glycols with higher weight average molecular weights, such as PEG 3350, PEG 4000, PEG 6000, or PEG 8000 have decreased solubility in water and decreased hygroscopicity, and thus, do not serve as shale inhibition agents in these formulations.

Embodiments include shale inhibition fluids containing substantially polyethylene glycol alone. Embodiments include shale inhibition fluids containing substantially polyethylene glycol in combination with water and other components to provide desirable density, viscosity, filtration control, rheology control, pH-control, surface activity modification, lubrication, flocculation, and protection from toxic or corrosive agents, or combinations thereof. The shale inhibition fluids can contain clays, natural or synthetic polymers, a weighting agent, an inert solid, a fluid loss-control agent, a salt, a dispersant, a corrosion inhibitor, thinner, thickener, a viscosifier, or a defoamer.

Examples of weighting agents used in these embodiments include, without limitations, high-specific gravity and finely divided solid materials, such as barite, hematite, calcium carbonate, siderite, or ilmenite. Examples of inert solids or certain chemically inactive solids present in the suspension include, without limitations, limestone, dolomite sands, salts or loading materials such as Barite. Examples of fluid loss-control agents used in these embodiments include, without limitations, starches, modified starches, cellulose, modified cellulose, synthetic polymers, such as sulfonated co and ter-polymers, polyacrylates, polyacrylamides, and lignites, and combinations thereof. Examples of thinners used to reduce viscosity and gel strength in these embodiments include, without limitations, lignosulfonates, polyphosphates, polyacrylates of low molecular weight, sulfonated polymers, phosphonic polymers, acrylic comb polymers, and other synthetic polymers. Examples of corrosion inhibitors used in these embodiments include, without limitations, chemical scavengers of oxygen, carbon dioxide, or hydrogen sulfide. A variety of surfactants serve as emulsifiers, foamers and defoamers, wetting agents and lubricants.

Polyethylene glycol can be present in certain embodiments at a concentration of less than about eighty weight percent (80 wt %) of the drilling fluid. Certain embodiments include shale inhibition fluids containing polyethylene glycol polymers at a concentration of five weight percent to eighty weight percent of the drilling fluids. Certain embodiments include shale inhibition fluids containing approximately sixty weight percent to eighty weight percent of polyethylene glycol. Certain embodiments include shale inhibition fluids containing less than seventy weight percent of polyethylene glycol. Certain embodiments of these compositions are not suitable for use with certain brines, such as polyethylene glycol polymers at a concentration of five weight percent to eighty weight percent of the drilling fluids are not suitable for formate brine-based drilling fluids. These formate brine-based drilling fluids are utilized with extremely low concentrations of polyethylene glycol (e.g. 1-5% v/v), and in these drilling fluids, the polyethylene glycol is added to the aqueous drilling fluid after the drilling fluid has contacted the contaminating salts. Certain embodiments of the aqueous drilling fluid compositions containing polyethylene glycol polymers, at a concentration of five weight percent to eighty weight percent of the drilling fluid, are prepared by mixing the polyethylene glycol polymers and water prior to introduction of other components, such as bentonite or salts.

Different types of polyethylene glycols can be used to formulate the shale inhibition fluids described here. In an embodiment, the shale inhibition fluid can contain polyethylene glycol polymers of varying molecular weights with an weight average molecular weight of 200 g/mol, 300 g/mol, 400 g/mol, 600 g/mol, 1200 g/mol, or 1500 g/mol, or combinations thereof, and having the properties shown in Table 1. These polyethylene glycol polymers are available, for example, from Saudi Arabia Basic Industries Corporation ("SABIC"), headquartered in Riyadh, Kingdom of Saudi Arabia, under the product line SAPEG® or from the Dow Chemical Company, headquartered in Midland, Mich., United States, under the product line CARBOWAX®.

TABLE 1

| Properties | PEG 200 | PEG 300 | PEG 400 | PEG 600 | PEG 1200 | PEG 1500 |
|---|---|---|---|---|---|---|
| Weight Average Molecular Weight (g/mol) | 200 | 300 | 400 | 600 | 1200 | 1500 |
| Distribution Range of Molecular weights (g/mol) | 190-210 | 285-315 | 380-420 | 570-630 | 1150-1250 | 1305-1595 |
| Appearance at 25° C. (degrees Celsius) | Clear Viscous Liquid | Clear Viscous Liquid | Clear Viscous Liquid | Clear Viscous Liquid | solid | solid |
| Hydroxyl No. (milligrams KOH/gram) | 535-590 | 356-394 | 267-295 | 178-197 | 89-99 | 70.5-83 |
| Water (%), Max. | 0.5 | 0.5 | 0.5 | 0.5 | 0.5 | 0.5 |
| Color (APHA), at 25° C., Max. | 40 | 40 | 40 | 40 | 50 | 50 |
| pH @ 25° C. 5 wt % in aqueous solution | 4.5-7.5 | 4.5-7.5 | 4.5-7.5 | 4.5-7.5 | 4.5-7.5 | 4.5-7.5 |
| Density @ 25° C., g/ml | 1.1238 | 1.12-1.13 | 1.1255 | 1.1258 | 1.0919 | 1.0919 |
| Freezing Range (° C.) | Sets to glass below-65 | 5 to 9 | 4 to 8 | 17-12 | 42-46 | 42-46 |
| Flash Point (° C.), | >150 | >150 | >150 | >220 | >240 | >240 |
| Ash Content %, Max. | 0.1 | 0.1 | 0.1 | 0 | 0.1 | 0.1 |

Certain embodiments include methods of preparing polyethylene glycol-based drilling fluid compositions. In an embodiment, the method includes the steps of providing a drilling fluid containing a water base and adding, to the drilling fluid, polyethylene glycol polymers of varying molecular weights ranging from 190 g/mol to 630 g/mol. For example, appropriate amounts of bentonite, a filtration control agent, and a pH modifier are added to an applicable amount of water to formulate an aqueous mixture. Other components such as a weighting agent, a corrosion inhibitor, a rheology modifier, a defoamer, and derivatives thereof can also be added. Selected polyethylene glycol polymers of varying molecular weights ranging from 190 g/mol to 630 g/mol are added to this aqueous mixture in a quantity sufficient to achieve the desired plastic viscosity and yield points. In certain embodiments, the polyethylene glycol polymers have a weight average molecular weight of 200 g/mol, or 400 g/mol, or 600 g/mol, or 1200 g/mol, or 1500 g/mol, or combinations thereof. The concentration of the polyethylene glycol polymers in the drilling fluid can range from 5% to 80% by weight of the drilling fluid. Certain embodiments of the compositions disclosed here are aqueous drilling fluids containing that do not contain any suspension stabilizer like hydrogenated castor oil or wax, unlike non-aqueous drilling fluids that contain polyethylene glycol. Certain embodiments of the compositions disclosed here are aqueous drilling fluids containing that do not contain any salt. Thus, the polyethylene glycols show good shale inhibition property even in the absence of salt in the fluid. Examples of such salts include potassium chloride, sodium chloride, potassium formate, and sodium formate.

Also disclosed are additional methods of preparing a drilling fluid composition. One such embodiment includes first mixing water and polyethylene glycol polymers; and then followed by the addition of bentonite to achieve a concentration of polyethylene glycol polymers of at least five percent by weight of the drilling fluid. In an embodiment, the polyethylene glycol polymers used in this method have a weight average molecular weight of 200 grams per mole. In an embodiment, the polyethylene glycol polymers used in the method can be present at a concentration ranging from 5% to 80% by weight of a water-miscible drilling fluid composition. The resulting drilling fluid can further include an additive being at least one member of the group consisting of a weighting agent, a fluid loss-control agent, a corrosion inhibitor, a rheology modifier, a defoamer, or their derivatives.

Certain embodiments include methods of stabilizing shale in a subterranean formation. One such method includes the steps of introducing a drilling fluid containing polyethylene glycol polymers through a wellbore, and circulating the drilling fluid through the wellbore during drilling. Also provided here are methods of drilling a wellbore through a formation. In certain embodiments, the method includes operating a drilling assembly to drill a wellbore and circulating a drilling fluid composition through the wellbore as it is drilled, the drilling fluid composition containing polyethylene glycol polymers of varying molecular weights ranging from 190 grams per mole to 630 grams per mole. In certain embodiments of these methods, polyethylene glycol polymers of varying molecular weights ranging from 190 g/mol to 630 g/mol are added in a quantity sufficient to achieve the desired plastic viscosity and yield points for the drilling fluids. Certain embodiments of this method can include drilling fluids containing polyethylene glycol polymers having a weight average molecular weight of 200 g/mol, or 400 g/mol, or 600 g/mol, or 1200 g/mol, or 1500 g/mol, or combinations thereof. In certain embodiments, the polyethylene glycol polymers have a weight average molecular weight of about 200 grams per mole. In certain embodiments, the polyethylene glycol is at a concentration of at least 50% by weight of the drilling fluid composition. In certain embodiments, the polyethylene glycol polymers have an average molecular weight of 200 grams per mole, or 400 grams per mole, or 600 grams per mole. In certain embodiments, the polyethylene glycol is at a concentration of at least 50% by weight of the drilling fluid composition. In certain embodiments, the polyethylene glycol is at a concentration of at least 70% by weight of the drilling fluid composition.

Example 1

The following formulations of polyethylene glycol-based shale inhibition fluids were developed. Formulation 1 was developed by mixing approximately 105 g of water with 10 g of bentonite for about 20 minutes, followed by the addition of 245 g of SAPEG® 200 polyethylene glycol and mixing for another 20 minutes. Formulation 2 was developed by mixing approximately 105 g of water with 10 g of bentonite for about 20 minutes, followed by the addition of 245 g of SAPEG® 300 polyethylene glycol and mixing for another 20 minutes. Formulation 3 was developed by mixing approximately 105 g of water with 10 g of bentonite for about 20 minutes, followed by the addition of 245 g of SAPEG® 400 polyethylene glycol and mixing for another 20 minutes. Formulation 4 was developed by mixing approximately 105 g of water with 10 g of bentonite for about 20 minutes, followed by the addition of 245 g of SAPEG® 600 polyethylene glycol and mixing for another 20 minutes. Formulation 5 was developed by mixing approximately 105 g of water with 10 g of bentonite for about 20 minutes. This formulation did not contain any polyethylene glycol. Formulation 6 was developed by mixing approximately 245 g of SAPEG® 400 polyethylene glycol with 105 g of water for about 30 minutes, followed by the addition of 10 g of bentonite and mixing for another 20 minutes. Formulation 7 was developed by mixing approximately 350 g of SAPEG® 400 polyethylene glycol with 10 g of bentonite for about 20 minutes. All formulations were mixed at room temperature and the rheological properties were subsequently measured.

Properties of the drilling fluid formulation, such as viscosity and gel strength, were analyzed using a standard oilfield viscometer. Shear rate measurements were taken with the fluids at 120° F. An example of a standard oilfield viscometer can include a FANN® Model 35 Viscometer, available from Fann Instrument Company, headquartered in Houston, Tex., USA. Gel Strength test used was according to the American Petroleum Institute (API) Recommended Practice 13B-2 (RP 13B-1). The shear stress (scale or dial reading) is determined as a function of the shear rate (from the speed of rotation). The dial readings are measured at different rotor sleeve speeds of 3, 6, 100, 200, 300, and 600 revolutions per minute (rpm), and shown in Table 2. Drilling fluids are also characterized by evaluating 10 second and 10 minute gel strength. The 10 second gel test is performed using a FANN® viscometer, and allowing the drilling fluid to rest for 10 seconds before measuring the peak shear stress at 3 rpm. The 10 minute gel test is performed using a FANN® viscometer, and allowing the drilling fluid to rest for 10 minute before measuring the peak shear stress at 3 rpm. Measurements from these tests provide an indication of the drilling fluids' ability to keep cuttings suspended.

The following data shows that superior inhibition of bentonite clay swelling is obtained when using SAPEG® 200 polyethylene glycol. Under these conditions, the optimum concentration appears to be around 70%, but presence of the polyethylene glycol at any concentration provides some inhibition. The large 10 minute-reading for Formulation 5 is due to the absence of any polyethylene glycol that leads to greater gelling by bentonite.

TABLE 2

| Test condition | Reading (cP) | | | | | | |
|---|---|---|---|---|---|---|---|
| | Form. 1 | Form. 2 | Form. 3 | Form. 4 | Form. 5 | Form. 6 | Form. 7 |
| 600 rpm | 30 | 32 | 41 | 41 | 20 | 38 | 82 |
| 300 rpm | 18 | 19 | 24 | 24 | 14 | 20 | 42 |
| 200 rpm | 14 | 14 | 17 | 17 | 11.5 | 14 | 28 |
| 100 rpm | 9 | 9 | 10 | 10 | 8 | 7 | 14 |
| 6 rpm | 3.5 | 3 | 3.5 | 3.5 | 5 | 1 | 2 |
| 3 rpm | 2.5 | 2.5 | 3 | 3 | 4 | 0.5 | 1 |
| 10 s | 2.5 | 3 | 5 | 5 | 6.5 | 1 | 2.5 |
| 10 m | 3 | 3.5 | 5 | 5 | 16 | 2 | 3 |

Plastic viscosity (PV) represents the viscosity of a fluid when extrapolated to infinite shear rate and can be expressed in units of centipoise (cP). PV indicates the type and concentration of the solids in a drilling fluid, and a low PV generally is preferred for a formulation as a lower PV indicates a faster potential drilling rate. Both PV and YP can be calculated using 300 revolutions per minute (rpm) and 600 rpm shear rate readings on a standard oilfield viscometer and can be calculated by Equations 1 and 2 as shown below.

$$PV = 600 \text{ rpm reading} - 300 \text{ rpm reading} \quad [\text{Equation 1}]$$

$$YP = 300 \text{ rpm reading} - PV \quad [\text{Equation 2}]$$

TABLE 3

| Property | Form. 1 | Form. 2 | Form. 3 | Form. 4 | Form. 5 | Form. 6 | Form. 7 |
|---|---|---|---|---|---|---|---|
| PV (cP) | 12 | 13 | 17 | 17 | 6 | 18 | 40 |
| YP (lbf/100 ft$^2$) | 6 | 6 | 7 | 7 | 8 | 2 | 2 |

Figure 2:
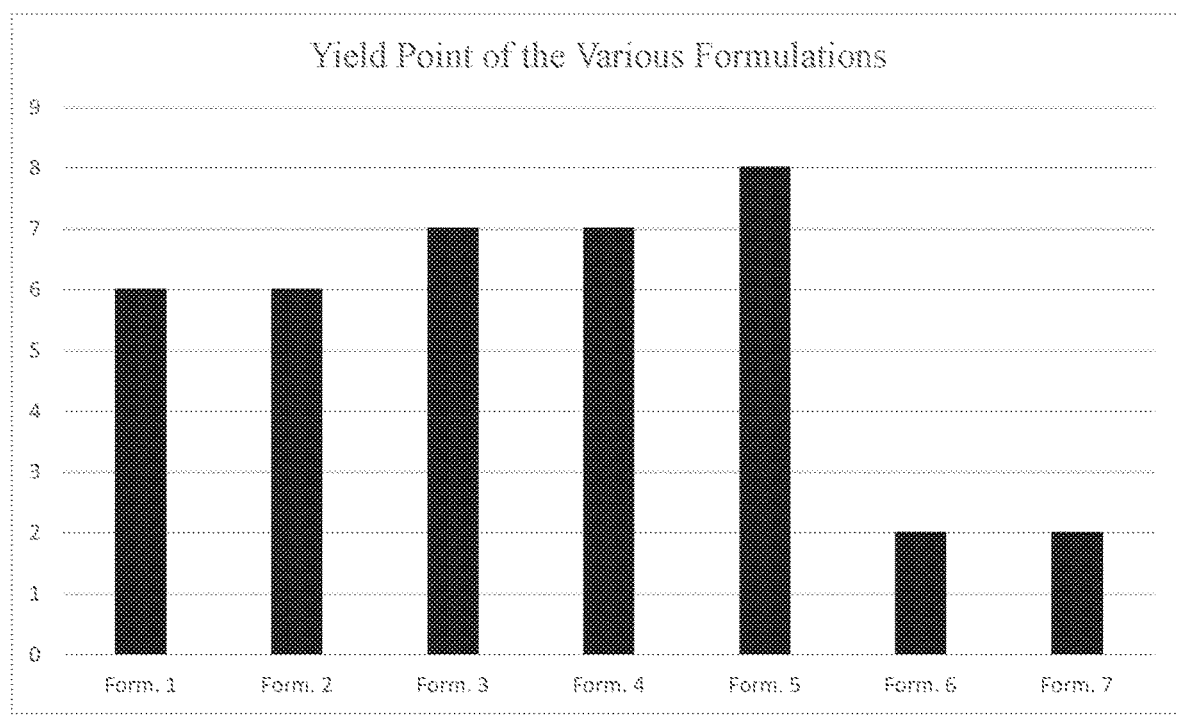
FIG. 2 is a graphical representation of the yield point (YP) of the drilling fluid formulations described in Example 1, in accordance with various embodiments.

As seen from Table 3 and FIG. 1, Formulation 7 that had only polyethylene glycol and Bentonite had the highest plastic viscosity, while Formulation 5 that had no polyethylene glycol had the lowest plastic viscosity. As seen from Table 3 and FIG. 2, Formulations 6 and 7 had the lowest yield points, while Formulation 5 that had no polyethylene glycol had the highest yield point. The YP value is an indicator of the shale inhibition capacity of the fluid. Higher the YP value, lower is the shale inhibition capacity of the fluid. The bentonite added in the fluid represents the shale cuttings that the fluid would encounter while drilling. Addition of the polyethylene glycol to the water prior to the addition of bentonite (shale cuttings) does not allow the bentonite (shale cuttings) to interact with water. This results in lowered YP of the drilling fluid compositions.

The interaction between drilling fluids and shale can cause wellbore instability, leading to wash out enlargements, tight hole conditions, poor log quality, and even stuck piping. Interaction between shale and drilling fluid can cause the shale formations to swell and result in dispersion of shale in the drilling fluid. This can slow the rate of penetration and cause poor bore hole stability. The polyethylene glycol-based compositions disclosed here can inhibit this interaction between shale and drilling fluid and prevent the swelling of shale formations and dispersion of shale in the drilling fluids, thus maintaining productive drilling operations.

Ranges may be expressed herein as from about one particular value and to about another particular value. When such a range is expressed, it is to be understood that another embodiment is from the one particular value and to the other particular value, along with all combinations within said range. Where the range of values is described or referenced herein, the interval encompasses each intervening value between the upper limit and the lower limit as well as the upper limit and the lower limit and includes smaller ranges of the interval subject to any specific exclusion provided.

While various embodiments have been described in detail for the purpose of illustration, they are not to be construed as limiting, but are intended to cover all the changes and modifications within the spirit and scope thereof.

What is claimed is:

1. A method of preparing a drilling fluid composition, the method comprising the steps of:
    mixing water and polyethylene glycol polymers of molecular weights in the range of 190 grams per mole to 630 grams per mole to form an aqueous solution of polyethylene glycol polymers;
    adding bentonite to the aqueous solution of polyethylene glycol polymers to form a drilling fluid composition having a concentration of polyethylene glycol polymers of at least five percent by weight of the drilling fluid; and
    allowing the polyethylene glycol polymers to prevent the bentonite from interacting with the water such that swelling of the bentonite does not occur,
    wherein the drilling fluid composition is in the absence of a salt.

2. The method of claim 1, further comprising the step of:
    adding, to the drilling fluid, an additive being at least one member of the group consisting of a weighting agent, a fluid loss-control agent, a corrosion inhibitor, a rheology modifier, a defoamer, and derivatives thereof.

3. The method of claim 1, wherein the polyethylene glycol polymers have a weight average molecular weight of 200 grams per mole.

4. The method of claim 1, wherein the polyethylene glycol polymers have a weight average molecular weight of 400 grams per mole.

5. The method of claim 1, wherein the polyethylene glycol polymers are present at a concentration ranging from 5% to 80% by weight of the drilling fluid.

6. The method of claim 1, wherein the polyethylene glycol polymers are present at a concentration ranging from 60% to 80% by weight of the drilling fluid.

7. A method of stabilizing shale in a subterranean formation, the method comprising:
    mixing water and polyethylene glycol polymers of molecular weights in the range of 190 grams per mole to 630 grams per mole to form an aqueous solution of polyethylene glycol polymers;
    adding bentonite to the aqueous solution of polyethylene glycol polymers to form a drilling fluid having a concentration of polyethylene glycol polymers of at least five percent by weight of the drilling fluid;
    providing, through a wellbore, the drilling fluid; and
    circulating the drilling fluid through the wellbore during drilling, wherein the polyethylene glycol polymers prevent the bentonite from interacting with the water such that swelling of the bentonite does not occur,
    wherein the drilling fluid is in the absence of a salt.

8. The method of claim 7, wherein the polyethylene glycol polymers have a weight average molecular weight of 200 grams per mole.

9. The method of claim 7, wherein the polyethylene glycol polymers have a weight average molecular weight of 400 grams per mole.

10. The method of claim 7, wherein the polyethylene glycol polymers are present at a concentration ranging from 5% to 80% by weight of the drilling fluid.

11. The method of claim 7, wherein the polyethylene glycol polymers are present at a concentration ranging from 60% to 80% by weight of the drilling fluid.

12. A drilling fluid composition comprising:
    an aqueous solution containing polyethylene glycol polymers of molecular weights in the range of 190 grams per mole to 630 grams per mole; and
    bentonite,
    wherein the polyethylene glycol polymers are configured to prevent the bentonite from interacting with water such that swelling of the bentonite does not occur,
    wherein the drilling fluid composition is in the absence of a salt.

13. The drilling fluid composition of claim 12, further comprising one or more of a weighting agent, a fluid loss-control agent, a corrosion inhibitor, a rheology modifier, a defoamer, and derivatives thereof.

14. The drilling fluid composition of claim 12, wherein the polyethylene glycol polymers have a weight average molecular weight of 200 grams per mole.

15. The drilling fluid composition of claim 12, wherein the polyethylene glycol polymers have a weight average molecular weight of 400 grams per mole.

16. The drilling fluid composition of claim 12, wherein the polyethylene glycol polymers are present at a concentration ranging from 5% to 80% by weight of the drilling fluid.

17. The drilling fluid composition of claim 12, wherein the polyethylene glycol polymers are present at a concentration ranging from 60% to 80% by weight of the drilling fluid.

18. The drilling fluid composition of claim 12, wherein the drilling fluid is substantially free of a suspension stabilizer.

* * * * *